(12) United States Patent
Ryder et al.

(10) Patent No.: US 8,893,629 B2
(45) Date of Patent: Nov. 25, 2014

(54) SYSTEM AND METHOD FOR COORDINATING PRODUCT DELIVERY WITH GROUND ENGAGING TOOL POSITION

(75) Inventors: Nicholas George Alfred Ryder, Saskatoon (CA); Michael J. Bloom, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 735 days.

(21) Appl. No.: 13/011,636

(22) Filed: Jan. 21, 2011

(65) Prior Publication Data

US 2012/0186504 A1    Jul. 26, 2012

(51) Int. Cl.
A01C 7/18    (2006.01)
A01C 7/10    (2006.01)
A01B 79/00   (2006.01)

(52) U.S. Cl.
CPC ............... *A01C 7/102* (2013.01); *A01B 79/005* (2013.01); *Y10S 111/90* (2013.01)
USPC .................................. 111/67; 111/900; 701/50

(58) Field of Classification Search
USPC .................. 111/67, 200, 900; 701/50; 37/348
See application file for complete search history.

(56) References Cited

U.S. PATENT DOCUMENTS

| | | | | |
|---|---|---|---|---|
| 2,563,186 A | * | 8/1951 | Oehler et al. | 192/69.81 |
| 2,670,699 A | * | 3/1954 | Kriegbaum | 111/67 |
| 2,695,576 A | * | 11/1954 | Starr | 111/9 |
| 2,752,022 A | * | 6/1956 | Harper | 192/23 |
| 2,880,811 A | * | 4/1959 | Kuester | 172/75 |
| 2,943,584 A | | 7/1960 | Palmer et al. | |
| 2,951,458 A | * | 9/1960 | Wade et al. | 111/52 |
| 2,968,264 A | * | 1/1961 | Schnell | 111/186 |
| 3,031,983 A | | 5/1962 | Hanson | |
| 3,060,872 A | | 10/1962 | Ackley | |
| 3,101,791 A | | 8/1963 | Van Londersele | |
| 3,108,482 A | * | 10/1963 | Polzin | 474/121 |
| 5,172,645 A | | 12/1992 | Billett et al. | |
| 5,601,237 A | | 2/1997 | Harding et al. | |
| 5,996,516 A | * | 12/1999 | Benneweis et al. | 111/176 |
| 6,510,367 B1 | * | 1/2003 | McQuinn | 700/241 |
| 7,555,990 B2 | | 7/2009 | Beaujot | |
| 2008/0047475 A1 | * | 2/2008 | Stehling et al. | 111/69 |
| 2009/0079624 A1 | | 3/2009 | Dean et al. | |
| 2010/0043685 A1 | * | 2/2010 | Gogerty et al. | 111/200 |

FOREIGN PATENT DOCUMENTS

JP    4091713    3/1992

* cited by examiner

*Primary Examiner* — Alicia Torres
(74) *Attorney, Agent, or Firm* — Rebecca L. Henkel (57) ABSTRACT

An agricultural implement system that includes a control system configured to receive a first signal to initiate seeding operations, to transition a ground engaging tool toward a working position at a first time after receiving the first signal, and to activate a product delivery system at a second time, different from the first time, after receiving the first signal.

19 Claims, 5 Drawing Sheets

SYSTEM AND METHOD FOR COORDINATING PRODUCT DELIVERY WITH GROUND ENGAGING TOOL POSITION

BACKGROUND

The invention relates generally to ground working equipment, such as agricultural equipment, and more specifically, to an implement configured to coordinate product delivery with the position of a ground engaging tool.

Generally, seeding implements are towed behind a tractor or other work vehicle via a hitch assembly secured to a rigid frame of a planter or seeder. These seeding implements typically include one or more ground engaging tools or openers that form a seeding path for seed deposition into the soil. The openers are used to break the soil to enable seed deposition. After the seeds are deposited, each opener is followed by a packer wheel that packs the soil on top of the deposited seeds.

In certain configurations, the openers are capable of transitioning between a working position and a non-working position. For example, after completion of a seed row, the openers may be transitioned to the non-working position in which the openers disengage the soil. Consequently, seeds will not be deposited in the soil as the implement is turned at a headland of a field, for example. Once the implement is aligned with the edge of a previously planted swath of soil, the openers may be transitioned to the working position in which the openers engage the soil.

As will be appreciated, it may be desirable to terminate a flow of product (e.g., seeds, fertilizer, etc.) to the openers while the openers are in the non-working position. In certain configurations, a farmer may manually control the flow of product. For example, the farmer may first manually disengage the flow of product, and then manually transition the openers to the non-working position. However, due to inherent delays in the product delivery system, product may still flow into the soil while the openers are transitioning to the non-working position. Consequently, seeds may be deposited at an improper depth. Conversely, if the flow of product terminates before the openers begin the transition to the non-working position, seeds may not be deposited within a portion of the field, thereby resulting in decreased yields.

Furthermore, to restart seeding operations, the farmer may first manually transition the openers to the working position, and then manually engage the flow of product. However, if the farmer does not properly coordinate product delivery with opener position, product may flow into the soil before the openers have transitioned to the working position. Consequently, seeds may be deposited at an improper depth. In addition, if the openers reach the working position prior to commencement of product flow, seeds may not be deposited within a portion of the field, thereby resulting in decreased yields.

BRIEF DESCRIPTION

The present invention provides an agricultural implement system including a control system configured to automatically coordinate product delivery with ground engaging tool position. In an exemplary embodiment, the agricultural implement system includes a ground engaging tool configured to engage soil in a working position and to disengage the soil in a non-working position. The agricultural implement system also includes a product delivery system configured to transfer product to the ground engaging tool such that the ground engaging tool deposits the product into the soil. The agricultural implement system further includes a control system configured to transition the ground engaging tool toward the working position at a first time and to activate the product delivery system at a second time such that the ground engaging tool reaches the working position and product deposition into the soil is initiated substantially simultaneously. In certain embodiments, the control system is also configured to transition the ground engaging tool toward the non-working position at a third time and to deactivate the product delivery system at a fourth time such that the ground engaging tool is withdrawn from the working position and product deposition into the soil is terminated substantially simultaneously. Such a configuration may substantially reduce or eliminate wasted product that may be delivered to an improper depth.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
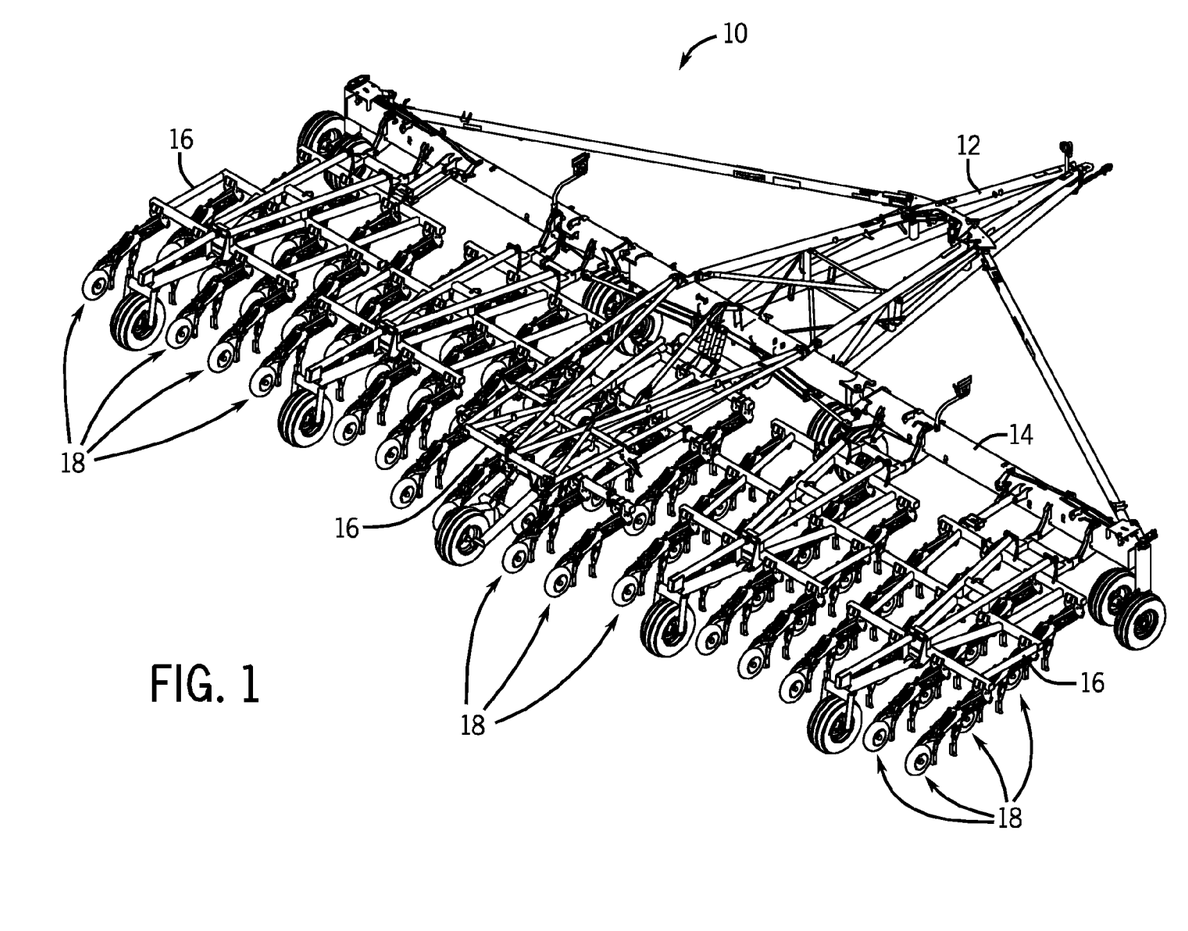
FIG. 1 is a perspective view of an exemplary implement including a control system configured to automatically coordinate product delivery with ground engaging tool position.

Turning now to the drawings, FIG. 1 is a perspective view of an exemplary implement 10 including a control system configured to automatically coordinate product delivery with ground engaging tool position. The implement 10 is designed to be towed behind a work vehicle such as a tractor. The implement 10 includes a tow bar assembly 12 which is shown in the form of an A-frame hitch assembly. The tow bar assembly 12 may include a hitch used to attach to an appropriate tractor hitch via a ball, clevis, or other coupling. The tow bar assembly 12 is coupled to a tool bar 14 which supports multiple tool frames 16, such as the illustrated center tool frame and wing tool frames. Each tool frame 16 includes multiple seeding implements, such as the illustrated row units or hoe openers 18.

As discussed in detail below, each hoe opener 18 includes an actuating cylinder configured to vary a working position of a ground engaging tool coupled to the hoe opener 18. In the present embodiment, the actuating cylinders are supplied by conduits extending from a fluid power supply. A directional control valve disposed between the actuating cylinders and the fluid power supply controls the position of the ground engaging tools. A control system communicatively coupled to the directional control valve is configured to coordinate the position of the ground engaging tools with operation of a product delivery system. For example, the control system may be configured to transition the ground engaging tools toward the working position at a first time and to activate the product delivery system at a second time such that the ground engaging tools reach the working position and product deposition into the soil is initiated substantially simultaneously. In addition, the control system may be configured to transition the ground engaging tools toward the non-working position at a third time and to deactivate the product delivery system at a fourth time such that the ground engaging tools are withdrawn from the working position and product deposition into the soil is terminated substantially simultaneously. Such a configuration may substantially reduce or eliminate wasted product that may be delivered to an improper depth.

Figure 2:
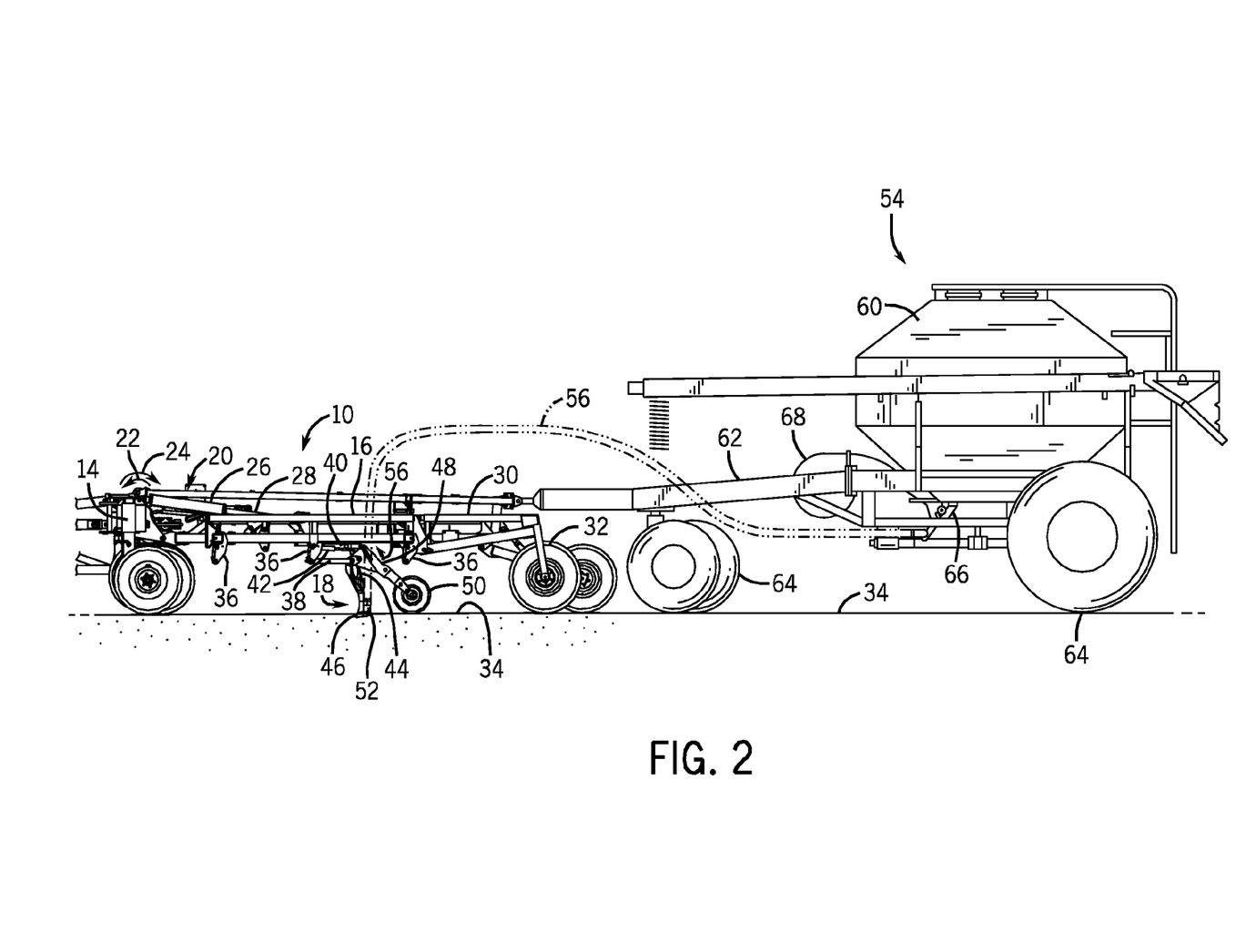
FIG. 2 is a side view of an air cart coupled to the implement shown in FIG. 1, illustrating a row unit in a working position.

FIG. 2 is a side view of an air cart coupled to the implement 10 shown in FIG. 1, illustrating a row unit 18 in a working position. In the illustrated embodiment, the implement 10 includes multiple frame actuators 20 configured to rotate each wing tool frame 16 in an upward direction 22 to transition the wing frames from the illustrated field position to a transport position. For example, hydraulic pressure may be applied to a rod end of a barrel 26, thereby driving a piston rod 28 to retract. Because the piston rod 28 is coupled to the wing tool frame 16, retraction of the piston rod 28 will urge the frame 16 to rotate in the upward direction 22 about a pivot at the bottom of the tool bar 14. With the frame 16 in the transport position, the row units 18 will disengage the soil, thereby facilitating transport of the implement 10 across a field. In addition, a flow of product (e.g., seeds, fertilizer, etc.) to the row units 18 may be temporarily suspended while the wing frames 16 are in the transport position. Consequently, the implement 10 may be moved across a field (e.g., turned at a headland) without depositing product within the soil.

Conversely, each wing frame 16 may be transitioned to the field position by applying hydraulic pressure to a cap end of the barrel 26, thereby driving the piston rod 28 to extend. Because the piston rod 28 is coupled to the wing tool frame 16, extension of the piston rod 28 will urge the frame 16 to rotate in a downward direction 24 about the pivot. With the wing frames 16 in the illustrated field position, the row units 18 may engage the soil, thereby facilitating seed deposition into the soil. As illustrated, the implement 10 includes a wheel assembly 30 having a wheel 32 which contacts the soil surface 34. Because the wing tool frames 16 may rotate in the direction 22 and/or 24, contact between the wheel 32 and the soil surface 34 may drive each wing tool frame 16 toward an orientation substantially parallel to the soil surface 34. Consequently, each row unit 18 may be properly positioned for seed and/or fertilizer deposition into the soil. In the present embodiment, the row units 18 are coupled to respective mounting brackets 36 on the wing tool frame 16. While a single row unit 18 is shown for clarity, it should be appreciated that a row unit may be coupled to each mounting bracket 36 on the frame 16. For example, in certain embodiments more than 2, 4, 6, 8, 10, 12, 14, 16, 18, 20, or more row units 18 may be coupled to each tool frame 16.

As illustrated, the row unit 18 includes a first member 38, a second member 40, and a tool actuator such as an actuating cylinder 42 (e.g., hydraulic and/or pneumatic piston-cylinder assembly) coupled to the mounting bracket 36. The cylinder 42 may be fluidly coupled to a fluid power supply that provides a flow of pressurized fluid which displaces a piston rod extending from the cylinder. It should be appreciated that the fluid power supply may be hydraulic or pneumatic, thereby powering the hydraulic or pneumatic cylinder 42. The mounting bracket 36 is configured to interface with the tool frame 16, thereby securing the row unit 18 to the implement 10. For instance, multiple row units 18 may be mounted in parallel along the tool frame 16. In the present configuration, the first member 38, the second member 40, and the mounting bracket 36 form elements of a parallel linkage, also known as a four bar linkage. As will be appreciated, components of the row unit 18, such as the mounting bracket 36, first member 38 and second member 40, may be made of any suitable material, such as steel.

The cylinder 42 is attached to a shank 44 via a pin at the end of the piston rod. The shank, in turn, is coupled to a ground engaging tool 46 via fasteners which enable height adjustment of the ground engaging tool 46 such that seeding depth may be varied. A pin is coupled to the first member 38 and the shank 44, enabling the shank 44 to pivotally rotate about the pin as the cylinder 42 extends and retracts. Accordingly, the ground engaging tool 46 moves in a downward or upward direction based upon extension or retraction of the cylinder 42. Consequently, the tool actuator/cylinder 42 is configured to vary a penetration depth of the ground engaging tool 46 into the soil 34 independently of a distance between the tool frame 16 and the soil 34. The shank 44 may feature several holes to receive a pin coupling the end of the cylinder 42 to the shank 44. The adapter holes may be used to adjust the angle of the cylinder 42 with respect to the parallel linkage assembly, thereby changing the angle and magnitude of cylinder forces.

In the present embodiment, partially relieving pressure to a cap end of the cylinder 42 will reduce the downward force applied by a packer wheel assembly 48. In addition, applying pressure to a rod end of the cylinder 42 will raise the packer wheel assembly 48, and will eventually lift the packing wheel 50 from the terrain. As will be appreciated, the packer wheel assembly 48 is configured to establish a desired penetration depth of the ground engaging tool 46 into the soil 34. In the present embodiment, the packer wheel assembly 48 may facilitate height adjustment of the packer wheel 50, in the form of a fastener and slot or an equivalent structure. To facilitate seed deposition during operation, the ground engaging tool 46 is coupled to a seed tube 52. As discussed in detail below, the seed tube is configured to receive a flow of product from a product delivery system.

As a result of this exemplary row unit configuration, the ground engaging tool 46 may be transitioned between a working position and a non-working position based on extension and retraction of the tool actuator/cylinder 42. As previously discussed, retraction of the cylinder 42 induces the ground engaging tool 46 to rotate in an upward direction, thereby extracting the ground engaging tool 46 from the soil, and transitioning the tool 46 toward the non-working position. Moving each ground engaging tool 46 into the non-working position facilitates transport of the seeding implement 10 by reducing the draft force associated with each tool 46. In addition, a flow of product (e.g., seeds, fertilizer, etc.) to the row unit 18 may be temporarily suspended when the ground engaging tools 46 are in the non-working position. Consequently, the seeding implement 10 may be moved across a field (e.g., turned at a headland) without depositing product within the soil, and without disturbing regions of the soil where product has already been deposited.

Conversely, each ground engaging tool 46 may be transitioned toward the working position by extending the tool actuator/cylinder 42, thereby driving the ground engaging tool 46 to rotate in a downward direction. As will be appreciated, while the ground engaging tool 46 is in the working position, the tool 46 may excavate a trench into the soil as the implement 10 traverses the field. Once a trench has been excavated, the product delivery system may deposit seeds and/or fertilizer into the soil via the seed tube 52. The packer wheel 50 may then close the trench, thereby forming a seed row suitable for crop development.

While the illustrated embodiment includes a frame actuator 20 and a tool actuator 42, it should be appreciated that alternative embodiments may only include one type of actuator 20 or 42. For example, in certain embodiments, the ground engaging tools 46 may be fixed relative to the tool frame 16. In such embodiments, the frame actuator 20 may rotate the tool frame 16 in the directions 22 and 24 to transition the ground engaging tools between the working/field position and the non-working/transport position. In alternative embodiments, the orientation of the tool frame 16 may be fixed relative to the tool bar 14. In such embodiments, the tool actuators 42 may transition the ground engaging tools 46 between the working and non-working positions.

As illustrated, an air cart 54 is coupled to the implement 10 via the center tool frame 16. In the illustrated embodiment, product (e.g., seeds and/or fertilizer) is transferred from the air cart 54 to the row unit 18 via a flow of air passing through a pneumatic seed distribution hose 56. For implements 10 with multiple row units 18, separate hoses 56 and/or a distribution system (e.g., including at least one manifold and multiple hoses) may be employed to transfer product from the air cart 54 to each row unit 18. The illustrated air cart 54 includes a storage tank 60, a frame 62, wheels 64, a product delivery system 66 and an air source 68. In certain configurations, the storage tank 60 includes multiple compartments for storing various flowable particulate materials. For example, one compartment may include seeds, and another compartment may include a dry fertilizer. In such configurations, the air cart 54 is configured to deliver both the seeds and fertilizer to the implement 10. The frame 62 includes a towing hitch configured to couple to the implement 10 or tow vehicle. Seeds and/or fertilizer within the storage tank 60 are gravity fed into the product delivery system 66. In the present embodiment, the product delivery system 66 is a metering assembly that includes meter rollers to regulate the flow of material from the storage tank 60 into an air flow provided by the air source 68. The air flow then carries the material to the implement 10, thereby supplying the row units 18 with seeds and/or fertilizer for deposition within the soil. As discussed in detail below, a control system is configured to coordinate operation of the product delivery system 66 with actuation of the ground engaging tools 46 (e.g., via the frame actuators 20, or the tool actuators 42) to substantially reduce or eliminate wasted product that may be deposited at an improper depth.

Figure 3:
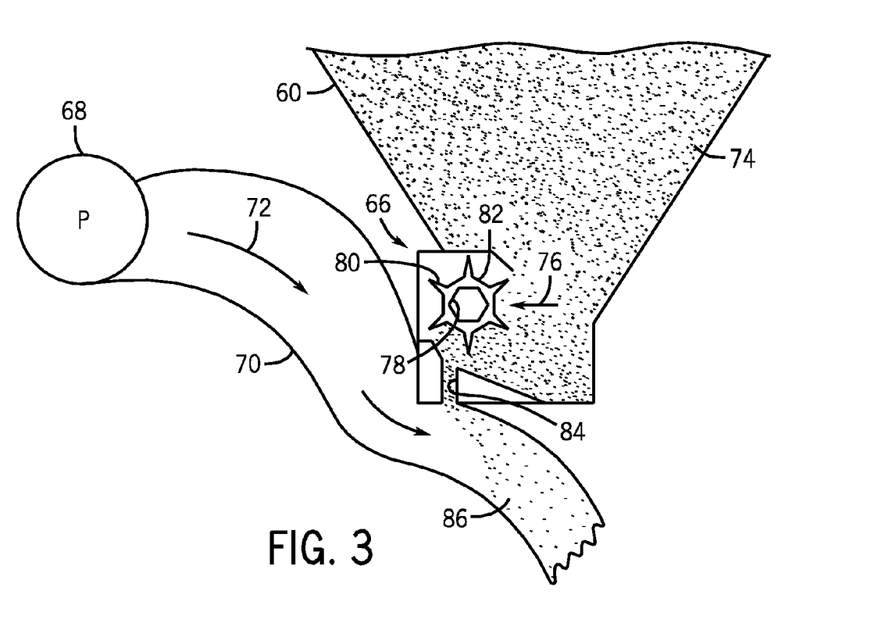
FIG. 3 is a schematic view of an exemplary product delivery system which may be employed within the air cart of FIG. 2.

FIG. 3 is a schematic view of an exemplary product delivery system 66 which may be employed within the air cart 54 of FIG. 2. As illustrated, the air source 68 is coupled to a conduit 70 configured to flow air 72 past the product delivery system 66. The air source 68 may be a pump or blower powered by an electric or hydraulic motor, for example. Flowable particulate material 74 (e.g., seeds, fertilizer, etc.) within the storage tank 60 flows by gravity into the product delivery system 66. The product delivery system 66 includes one or more meter rollers 76 configured to regulate the flow of material 74 into the air flow 72. More particularly, the product delivery system 66 may include multiple meter rollers 76 disposed adjacent to one another along a longitudinal axis of the rollers 76. For example, certain product delivery systems 66 include seven meter rollers 76. Such systems 66 are known as "7-run" metering assemblies. However, alternative embodiments may include more or fewer meter rollers 76, e.g., 5, 6, 7, 8, 9, or more. Further embodiments may include one continuous meter roller 76.

Each meter roller 76 includes an interior cavity 78 configured to receive a shaft that drives the meter roller 76. In the present embodiment, the cavity 78 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 76. Alternatively, the meter rollers 76 may be coupled to a wheel 64 by a gear assembly such that rotation of the wheel 64 drives the meter rollers 76 to rotate. Such a configuration will automatically vary the rotation rate of the meter rollers 76 based on the speed of the air cart 54.

Each meter roller 76 also includes multiple flutes 80 and recesses 82. The number and geometry of the flutes 80 are particularly configured to accommodate the material 74 being distributed. The illustrated embodiment includes six flutes 80 and a corresponding number of recesses 82. Alternative embodiments may include more or fewer flutes 80 and/or recesses 82. For example, the meter roller 76 may include 1, 2, 3, 4, 5, 6, 7, 8, 9, 10, or more flutes 80 and/or recesses 82. In addition, the depth of the recesses 82 and/or the height of the flutes 80 are configured to accommodate the material 74 within the storage tank 60. For example, a meter roller 76 having deeper recesses 82 and fewer flutes 80 may be employed for larger seeds, while a meter roller 76 having shallower recesses 82 and more flutes 80 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 76 controls the flow of material 74 into the air stream 72. Specifically, as the meter roller 76 rotates, material is transferred through an opening 84 in the product delivery system 66 into the conduit 70. The material then mixes with air from the air source 68, thereby forming an air/material mixture 86. The mixture then flows to the row units 18 of the implement 10 via the pneumatic conduits 56, where the seeds and/or fertilizer are deposited within the soil. In the present embodiment, the product delivery system 66 may be deactivated by stopping rotation of the meter rollers 76, thereby substantially blocking the flow of material through the opening 84. Conversely, the product delivery system 66 may be activated by engaging rotation of the meter rollers 76. In this manner, product flow to the row units 18 may be temporarily suspending while the ground engaging tools 46 are in the non-working position. While the illustrated embodiment utilizes a meter roller 76 to supply product to the air stream 72, it should be appreciated that alternative embodiments may employ other devices, such as an auger, to regulate the flow of product to the conduit 70.

Figure 4:
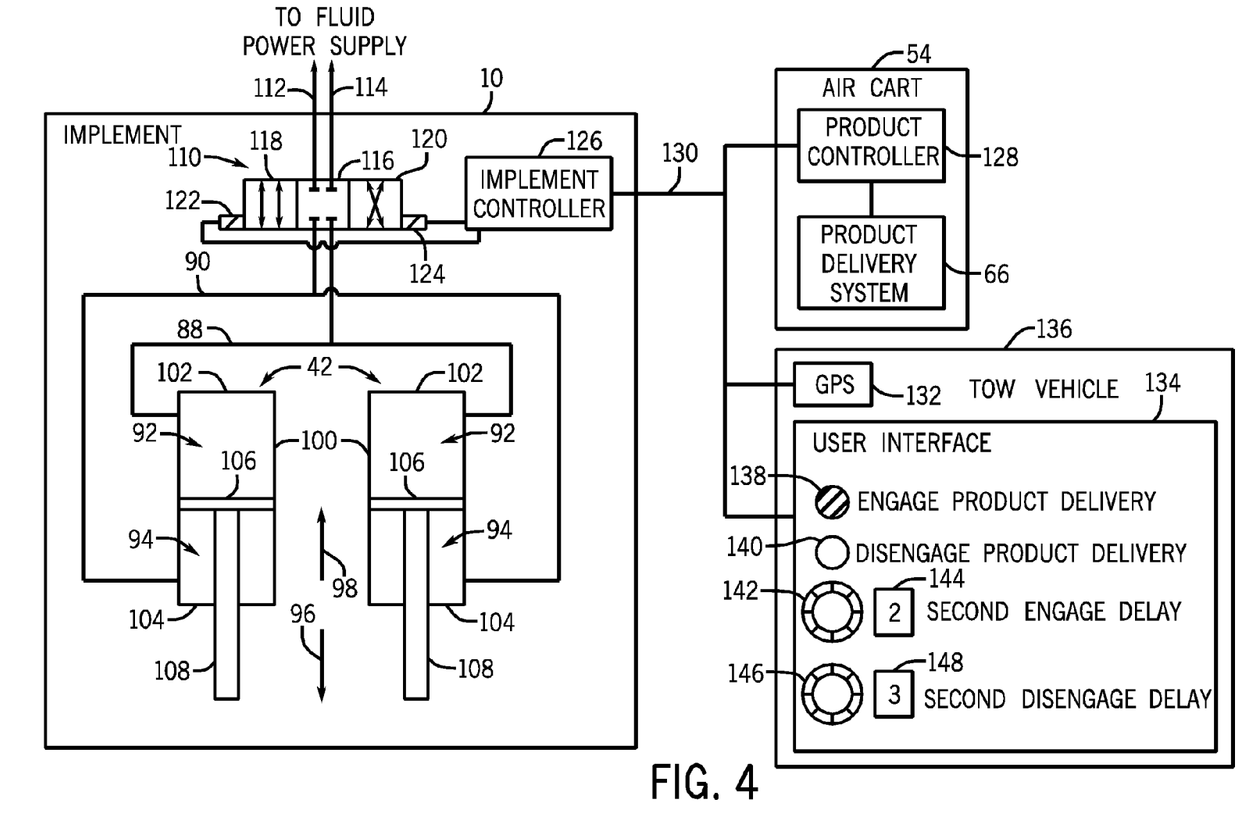
FIG. 4 is a schematic view of an exemplary implement system including a control system configured to control operation of a directional control valve to coordinate ground engaging tool position with operation of the product delivery system.

FIG. 4 is a schematic view of an exemplary implement system 10 including a control system configured to control operation of a directional control valve to coordinate ground engaging tool position with operation of the product delivery system 66. As illustrated, a first fluid conduit 88 and a second fluid conduit 90 extend to each actuating cylinder 42. While two actuating cylinders 42 are illustrated, it should be appreciated that more or fewer cylinders 42 may be employed within the implement 10. For example, in certain configurations, one actuating cylinder 42 may be employed for each hoe opener 18 to transition each ground engaging tool 46 between the working and non-working positions. In alternative embodiments, a single actuating cylinder may be employed to transition the entire implement 10 between the working and non-working positions by rotating the implement in an upward direction, for example. In further embodiments, one actuating cylinder 20 may be coupled to each wing tool frame 16 and configured to rotate each wing tool frame 16 about the tool bar 14 to transition the hoe openers 18 between the working and non-working positions. In each embodiment, the cylinders 42 may be arranged in a parallel flow configuration in which each cylinder 42 is directly coupled to the first and second conduits 88 and 90. In other words, fluid does not flow from one cylinder 42 to another in a serial flow configuration.

As illustrated, the first fluid conduit 88 is coupled to a first side of each cylinder 42, while the second fluid conduit 90 is coupled to a second side of each cylinder 42. In the present embodiment, the first fluid conduit 88 is coupled to a cap side 92 of the cylinder 42, and the second fluid conduit 90 is coupled to a rod side 94 of the cylinder 42. Consequently, applying fluid pressure to the first conduit 88 induces the cylinder 42 to extend in the direction 96, while applying fluid pressure to the second conduit 90 induces the cylinder 42 to retract in the direction 98. It should be appreciated that in alternative embodiments, the cylinder 42 may be reversed such that the first fluid conduit 88 is coupled to the rod side 94, and the second fluid conduit 90 is coupled to the cap side 92. In such embodiments, applying fluid pressure to the first fluid conduit 88 will induce the cylinder 42 to retract in the direction 98, while applying fluid pressure to the second conduit 90 will induce the cylinder 42 to extend in the direction 96.

As illustrated, the actuating cylinders 42 include a barrel 100 having an end cap 102, a gland 104, and a piston 106. As will be appreciated, the cap end 92 is defined by a volume formed from the piston 106, barrel 100 and end cap 102, while the rod end 94 is defined by a volume formed from the piston 106, barrel 100 and gland 104. Furthermore, a rod 108 is coupled to the piston 106 such that movement of the piston 106 drives the rod 108 to translate in the direction 96 and/or 98. As will be further appreciated, various seals may be employed between the rod 108 and the gland 104 to block a flow of fluid from exiting the cylinder 42. In addition, the piston 106 includes additional seals to block a flow of fluid between the cap side 92 and the rod side 94 of the cylinder 42. In the present embodiment, applying fluid pressure to the first conduit 88 increases pressure to the cap side 92 of the cylinder 42, thereby driving the piston 106 and the rod 108 in the direction 96. Conversely, applying fluid pressure to the second conduit 90 increases pressure to the rod side 94 of the cylinder 42, thereby driving the piston 106 and the rod 108 in the direction 98. It should be appreciated that increasing pressure to one conduit may be accompanied by a decrease in pressure to the other conduit to facilitate movement of the piston 106 within the barrel 100. It should further be appreciated that the cylinders 42 may be particularly configured to operate based on pneumatic or hydraulic fluid pressure.

As illustrated, the first conduit 88 and the second conduit 90 are coupled to a directional control valve 110 configured to control fluid flow from the fluid power supply to the actuating cylinders 42. In the present embodiment, the directional control valve 110 is a three-position/four-way hydraulic valve configured to control a flow of hydraulic fluid. However, it should be appreciated that a pneumatic directional control valve 110 may be employed within embodiments utilizing pneumatic cylinders 42. In the present embodiment, a supply conduit 112 and a return conduit 114 are coupled to the directional control valve 110. The supply conduit 112 is configured to provide fluid to the implement 10, while the return conduit 114 enables fluid to return to the fluid power supply. As discussed in detail below, the supply conduit 112 and the return conduit 114 may be coupled to a control valve within the tow vehicle such that fluid flow to the implement 10 may be manually adjusted.

In the present embodiment, the directional control valve 110 includes a first position 116 configured to block fluid flow from the supply and return conduits 112 and 114 to the first and second conduits 88 and 90. While the directional control valve 110 is in the first position 116, fluid pressure within the cap end 92 and the rod end 94 of each cylinder 42 will be maintained, thereby holding the ground engaging tools 46 in a desired position. The directional control valve 110 also includes a second position 118 that establishes a fluid connection between the supply conduit 112 and the second conduit 90, and between the return conduit 114 and the first conduit 88. While the directional control valve 110 is in the second position 118, fluid will flow from the supply conduit 112 to the rod end 94 of each cylinder 42 and from the cap end 92 of each cylinder 42 to the return conduit 114, thereby inducing the piston rods 108 to retract in the direction 98. Consequently, transitioning the directional control valve 110 to the second position 118 induces the ground engaging tools 46 to rotate toward the non-working position. Furthermore, the directional control valve 110 includes a third position 120 that establishes a fluid connection between the supply conduit 112 and the first conduit 88, and between the return conduit 114 and the second conduit 90. While the directional control valve 110 is in the third position 120, fluid will flow from the supply conduit 112 to the cap end 92 of each cylinder 42 and from the rod end 94 of each cylinder 42 to the return conduit 114, thereby inducing the piston rods 108 to extend in the direction 96. Consequently, transitioning the directional control valve 110 to the third position 120 induces the ground engaging tools 46 to rotate toward the working position.

As illustrated, the directional control valve 110 includes two actuators 122 and 124 configured to adjust the position of the valve 110. In the present embodiment, the first actuator 122 is a solenoid configured to drive the directional control valve 110 to the second position 118, and the second actuator 124 is a solenoid configured to drive the valve 110 to the third position 120. Both the first and second actuators 122 and 124 are coupled to an implement controller 126 configured to adjust the position of the directional control valve 110. Consequently, the implement controller 126 may vary the position of the ground engaging tools 46 by adjusting the position of the directional control valve 110. For example, the controller 126 may transition the ground engaging tools 46 toward the working position by driving the directional control valve 110 to the third position 120 via the second actuator 124. The controller 126 may also transition the ground engaging tools 46 toward the non-working position by driving the directional control valve 110 to the second position 118 via the first actuator 122.

In certain embodiments, the position of the ground engaging tools 46 may be manually adjustable. For example, the implement controller 126 may transition the directional control valve 110 to the second position 118, thereby establishing a fluid connection between the supply conduit 112 and the second conduit 90, and between the return conduit 114 and the first conduit 88. Fluid flow to the supply conduit 112 and the return conduit 114 may then be adjusted to vary the position of the ground engaging tools 46. For example, the supply conduit 112 and the return conduit 114 may be coupled to a control valve within a tow vehicle. In this configuration, an operator may manually control the flow of fluid to the implement 10 by varying the position of the control valve. In this manner, the position of the ground engaging tools 46 may be manually adjusted. In further embodiments, an electronic or electromechanical actuator may be coupled to each ground engaging tool 46 to transition the tools between the working and non-working positions. In such embodiments, the implement controller 126 may be communicatively coupled to each actuator to facilitate automatic and/or manual control of ground engaging tool position.

As illustrated, the implement controller 126 is communicatively coupled to a product controller 128 within the air cart 54 via a communication bus 130. As will be appreciated, the implement controller 126 and the product controller 128 may be communicatively linked by a wireless connection, a wired connection, or an optical fiber connection, for example. Furthermore, the communication bus 130 may employ any suitable communication protocol such as CAN Bus or ISO Bus, for example. The implement controller 126 and the product controller 128 form elements of a control system configured to coordinate the position of the ground engaging tools 46 with operation of the product delivery system 66 to substantially reduce or eliminate wasted product that may be deposited at an improper depth. For example, in certain embodiments, the implement controller 126 may be configured to control the position of the ground engaging tools 46, and to send signals to the product controller 128 instructing the controller 128 to activate or deactivate the product delivery system 66. Alternatively, the product controller 128 may control the product delivery system 66, and send signals to the implement controller 126 instructing the controller 126 to raise or lower the ground engaging tools 46. Furthermore, while a single implement controller 126 and a single product controller 128 are employed in the illustrated embodiment, it should be appreciated that alternative embodiments may include multiple controllers coupled to the implement 10 and/or the air cart 54 to control operation of the ground engaging tools 46 and/or the product deliver system 66.

In the illustrated embodiment, the control system is configured to transition the ground engaging tools 46 toward the working position at a first time and to activate the product delivery system 66 at a second time such that the ground engaging tools 46 reach the working position and product deposition into the soil is initiated substantially simultaneously. In addition, the control system is configured to transition the ground engaging tools 46 toward the non-working position at a third time and to deactivate the product delivery system 66 at a fourth time such that the ground engaging tools 46 are withdrawn from the working position and product deposition into the soil is terminated substantially simultaneously. In this manner, a proper flow of product may be provided to the hoe openers 18 during each phase of planting and/or seeding operations.

As illustrated, the implement controller 126 and the product controller 128 are coupled to a spatial locating device, such as the illustrated Global Positioning System (GPS) 132, and a user interface 134 within a tow vehicle 136 via the bus 130. However, it should be appreciated that the GPS 132 may be omitted in certain embodiments. In the illustrated embodiment, the user interface 134 includes a first button 138 configured to engage product delivery, and a second button 140 configured to disengage product delivery. As will be appreciated, alternative embodiments may include a single switch or knob configured to engage and disengage product delivery. The user interface 134 also includes a first knob 142 configured to adjust a product engagement delay, and a first display 144 configured to display the magnitude of the engagement delay. In addition, the user interface 134 includes a second knob 146 configured to adjust a product disengagement delay, and a second display 148 configured to display the magnitude of the disengagement delay. As will be appreciated, alternative embodiments of the user interface 134 may include alternative inputs for adjusting the engagement and disengagement delays, and/or alternative displays to indicate the magnitude of the delays.

In the present embodiment, an operator may engage product delivery by depressing the first button 138. The user interface 134 will then send a signal to the control system (e.g., the implement controller 126 and/or the product controller 128) to initiate seeding operations. The control system, in turn, will transition the ground engaging tools 46 toward the working position at a first time after receiving the signal, and will activate the product delivery system 66 at a second time after receiving the signal. In the present embodiment, the first time and the second time are selected by adjusting the engagement delay via the first knob 142. By way of example, five seconds may elapse between activation of the product delivery system 66 and a flow of product reaching the seed tubes 52. For example, activation of the product delivery system 66 may involve initiation of meter roller rotation. Once the meter rollers 76 begin to rotate, product 74 will enter the conduit 70. However, due to the length of the distribution hose 56, five seconds may elapse before the air flow 72 conveys the product to the seed tubes 52. Furthermore, the process of transitioning the ground engaging tools 46 to the working position may take seven seconds. Consequently, to ensure that the flow of product reaches the ground engaging tools 46 at the same time the ground engaging tools 46 fully engage the soil, a two second delay may be employed between initiation of ground engaging tool rotation and activation of the product delivery system 66.

In such a configuration, the operator may adjust the first knob 142 until the first display 144 indicates a two second engagement delay. As a result, once the operator depresses the first button 138, the control system will immediately begin transitioning the ground engaging tools 46 toward the working position. Two seconds later, the control system will activate the product delivery system 66. Consequently, the first time associated with transitioning the ground engaging tools 46 toward the working position is zero seconds, and the second time associated with activation of the product delivery system is two seconds. As previously discussed, the implement controller 126 may transition the ground engaging tools toward the working position by driving the directional control valve 110 to the third position 120 via the actuator 124, thereby establishing a fluid connection between the supply conduit 112 and the cap side 92 of the cylinders 42 and between the return conduit 114 and the rod side 94 of the cylinders 42. In addition, the control system may activate the product delivery system 66 (e.g., via the product controller 128) which may, in turn, initiate rotation of the meter rollers 76.

While a five second product delivery time and a seven second ground engaging tool transition time are described above, it should be appreciated that a higher or lower product delivery time and/or transition time may be present in alternative embodiments. For example, the product delivery time may be approximately 1, 2, 3, 4, 5, 6, 7, 8, 9 or 10 seconds, or more. Similarly, the time to transition the ground engaging tools 46 to the working position may be approximately 1, 2, 3, 4, 5, 6, 7, 8, 9 or 10 seconds, or more. In certain embodiments, the transition time may be less than the product delivery time. In such embodiments, the second time may be zero seconds, while the first time may be 1, 2, 3, 4, 5 or 6 seconds, or more. For example, embodiments configured to transition the ground engaging tools toward the working position via rotation of the tool frame 16 may take approximately four seconds to complete the transition. In such embodiments, the operator may adjust the first knob 142 such that the display 144 indicates a value of negative one (−1) seconds. Consequently, when the operator depresses the first button 138, the control system will activate the product delivery system 66 one second prior to initiating the transition of the ground engaging tools 46 toward the working position. As a result, the product will reach the seed tubes 52 at substantially the same time that the ground engaging tools fully engage the soil.

Conversely, an operator may disengage product delivery by depressing the second button 140. The user interface 134 will then send a signal to the control system to terminate seeding operations. The control system, in turn, will transition the ground engaging tools 46 toward the non-working position at a third time after receiving the signal, and will deactivate the product delivery system 66 at a fourth time after receiving the signal. In the present embodiment, the third time and the fourth time are selected by adjusting the disengagement delay via the second knob 146. By way of example, four seconds may elapse between deactivation of the product delivery system 66 and termination of product flow at the seed tubes 52. For example, deactivation of the product delivery system 66 may involve stopping meter roller rotation. Once the meter rollers 76 stop, product 74 will no longer enter the conduit 70. However, due to the length of the distribution hose 56, four seconds may elapse before the air flow 72 conveys all of the remaining product to the seed tubes 52. Furthermore, one second may elapse between initiation of ground engaging tool rotation and movement of the tools 46 toward the non-working position. As will be appreciated, contact between the soil and the ground engaging tools 46 may establish a resistance to upward rotation. Therefore, one second may elapse before sufficient fluid pressure is provided to the rod end 94 of the cylinders 42 to overcome the resistance. Consequently, to ensure product flow into the soil terminates at the same time the ground engaging tools 46 are withdrawn from the working position, a three second delay may be employed between deactivation of the product delivery system 66 and initiation of ground engaging tool rotation.

Therefore, the operator may adjust the second knob 146 until the second display 148 indicates a three second disengagement delay. As a result, once the operator depresses the second button 140, the control system will immediately deactivate the product delivery system 66. Three seconds later, the control system will begin transitioning the ground engaging tools 46 toward the non-working position. Consequently, the third time associated with transitioning the ground engaging tools 46 toward the non-working position is three seconds, and the fourth time associated with deactivation of the product delivery system 66 is zero seconds. As previously discussed, the implement controller 126 may transition the ground engaging tools 46 toward the non-working position by driving the directional control valve 110 toward the second position 118 via the actuator 122, thereby establishing a fluid connection between the supply conduit 112 and the rod side 94 of the cylinders 42 and between the return conduit 114 and the cap side 92 of the cylinders 42. In addition, the control system may deactivate the product delivery system 66 (e.g., via the product controller 128) which may, in turn, stop rotation of the meter rollers 76.

While a four second product termination time and a one second ground engaging tool rotation time are described above, it should be appreciated that a higher or lower product termination time and/or rotation time may be present in alternative embodiments. For example, the product termination time may be approximately 1, 2, 3, 4, 5, 6, 7, 8, 9 or 10 seconds, or more. Similarly, the time to initiate rotation of the ground engaging tools 46 toward the non-working position may be approximately 1, 2, 3, 4, 5, 6, 7, 8, 9 or 10 seconds, or more. In certain embodiments, the product termination time may be less than the rotation initiation time. In such embodiments, the third time may be zero seconds, while the fourth time may be 1, 2, 3, 4, 5 or 6 seconds, or more. For example, embodiments configured to transition the ground engaging tools toward the non-working position via rotation of the tool frame 16 may take approximately 5 seconds to initiate the rotation. In such embodiments, the operator may adjust the second knob 146 such that the second display 148 indicates a value of negative one (−1) seconds. Consequently, when the operator depresses the second button 140, the control system will initiate the transition of the ground engaging tools 46 toward the non-working position one second prior to deactivating the product delivery system 66. As a result, product flow to the seed tubes 52 will terminate at substantially the same time that the ground engaging tools are withdrawn from the working position.

While the engagement delay and the disengagement delay may be input through the user interface 134 in the present embodiment, it should be appreciated that alternative embodiments may employ a control system having predetermined delay times. In further embodiments, the delay times may be automatically calculated based on air velocity, hydraulic pressure, length of the distribution hose 56, product type, etc. In such embodiments, the relevant parameters may be input through the user interface 134. In addition, it should be appreciated that delay times may be selected such that the ground engaging tools reach the working position and product deposition into the soil is initiated at different times, and/or the ground engaging tools are withdrawn from the working position and product deposition into the soil is terminated at different times.

Furthermore, while the engagement/disengagement of product delivery and the position of the ground engaging tools are controlled via the user interface 134 in the present embodiment, it should be appreciated that alternative embodiments may utilize the GPS 132 to automatically control seeding operations. For example, the GPS 132 may detect when the implement 10 reaches the end of a row, and automatically disengage product delivery and transition the ground engaging tools to the non-working position based on the disengagement delay. In addition, the GPS 132 may detect when the implement reaches the beginning of a subsequent row, and automatically engage product delivery and transition the ground engaging tools to the working position based on the engagement delay. By utilizing delay times to initiate and terminate seeding operations, inaccuracies associated with manually controlling the ground engaging tools and product delivery system may be substantially reduced or eliminated. In addition, because the ground engaging tools 46 and the product delivery system 66 are controlled by the control system, a work switch used to control operation of the product delivery system based on position of the ground engaging tools is obviated.

Figure 5:
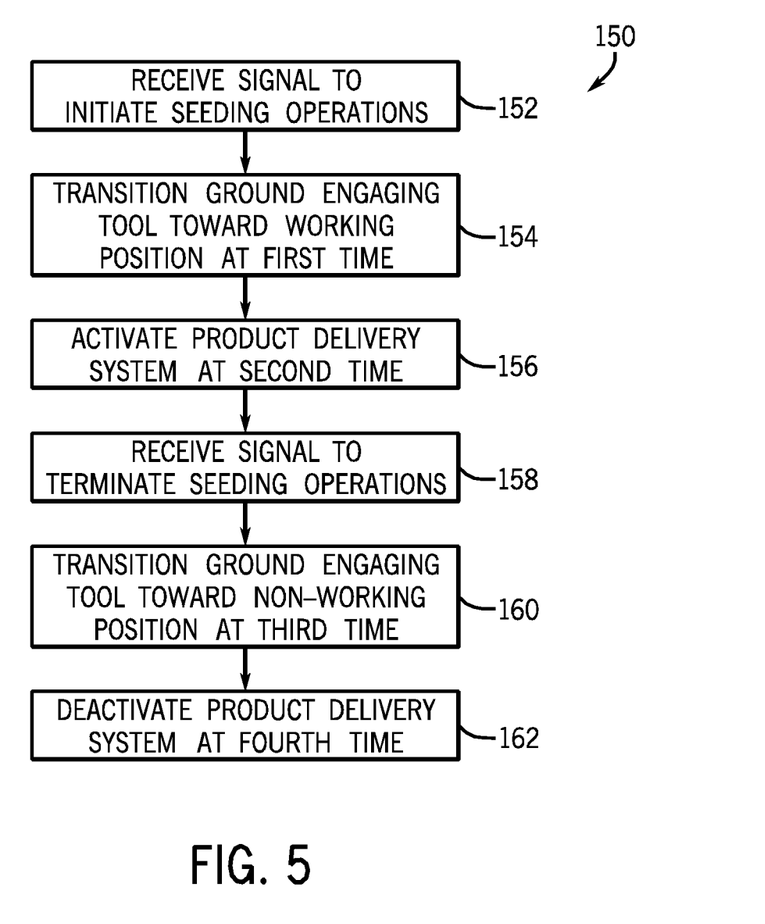
FIG. 5 is a flow diagram of an exemplary method of operating the implement to automatically coordinate product delivery with ground engaging tool position.

FIG. 5 is a flow diagram of an exemplary method 150 of operating the implement 10 to automatically coordinate product delivery with ground engaging tool position. First, as represented by block 152, a signal to initiate seeding operations is received. As previously discussed, the signal to initiate seeding operations may be sent from the user interface 134 within the tow vehicle 136 based on operator input. Alternatively, the signal may be sent by a spatial locating device (e.g., GPS 132) such that seeding operations may be initiated automatically in response to implement position. In certain embodiments, the signal to initiate seeding operations is received by the controller 126 mounted on the implement 10 or the controller 128 mounted on the air cart 54.

Next, as represented by block 154, the ground engaging tools 46 are transitioned to the working position at a first time. In addition, the product delivery system 66 is activated at a second time, as represented by block 156. As previously discussed, the first and second times are selected such that the ground engaging tools reach the working position and product deposition into the soil is initiated substantially simultaneously. For example, the control system may immediately initiate the transition of the ground engaging tools 46 toward the working position and delay activation of the product delivery system 66. Alternatively, the control system may immediately activate the product delivery system 66 and delay transitioning the ground engaging tools 46 toward the working position (i.e., step 156 occurs prior to step 154). In this manner, product will be deposited into the soil when the ground engaging tools 46 have completed the transition to the working position. Consequently, product will be deposited at a desired depth, thereby substantially reducing or eliminating wasted product.

Once a row has been planted, a signal to terminate seeding operations will be received, as indicated by block 158. As previously discussed, the signal to terminate seeding operations may be sent by the user interface 134 or a spatial locating device (e.g., the GPS 132). Next, as represented by block 160, the ground engaging tools 46 are transitioned toward the non-working position at a third time. In addition, the product delivery system 66 is deactivated at a fourth time, as represented by block 162. The third and fourth times are selected such that the ground engaging tools 46 are withdrawn from the working position and product deposition into the soil is terminated substantially simultaneously. For example, the control system may immediately transition the ground engaging tools 46 toward the non-working position and delay deactivation of the product delivery system 66. Alternatively, the control system may immediately deactivate the product delivery system 66 and delay transitioning the ground engaging tools 46 toward the non-working position (i.e., step 162 occurs prior to step 160). In this manner, product flow to the seed tubes 52 will terminate at substantially the same time that the ground engaging tools 46 are withdrawn from the working position. Consequently, product will be deposited at a desired depth, thereby substantially reducing or eliminating wasted product.

While some of the components will be on and integrated into the towed implement 10, others may be either on the implement 10, on the air cart 54 or on the tow vehicle 136. For example, processing circuitry, control circuitry, and so forth may be located on a tractor and configured to control operation of the ground engaging tools 46 and/or the product delivery system 66. For instance, a controller within the tow vehicle 136 may coordinate the position of the ground engaging tools 46 with operation of the product delivery system 66 to substantially reduce or eliminate wasted product that may be deposited at an improper depth. Signals associated with operation of the ground engaging tools 46 and/or the product delivery system 66 may be transmitted through any suitable interface, such as a CAN Bus or ISO Bus, for example. All such arrangements are intended to be covered by the appended claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement system, comprising:
    a ground engaging tool configured to engage soil in a working position and to disengage the soil in a non-working position;
    a product delivery system configured to transfer product to a seed tube proximate to the ground engaging tool, wherein the seed tube is configured to deposit the product into the soil; and
    a control system configured to transition the ground engaging tool toward the working position at a first time and to activate the product delivery system at a second time, different from the first time, such that the ground engaging tool reaches the working position and product deposition into the soil is initiated substantially simultaneously, and wherein the control system is configured to transition the ground engaging tool toward the non-working position at a third time and to deactivate the product delivery system at a fourth time, different from the third time, such that the ground engaging tool is withdrawn from the working position and product deposition into the soil is terminated substantially simultaneously.

2. The agricultural implement system of claim 1, comprising a user interface configured to adjust the first time, the second time, the third time, and the fourth time.

3. The agricultural implement system of claim 1, comprising an actuating cylinder coupled to the ground engaging tool and configured to transition the ground engaging tool between the working position and the non-working position.

4. The agricultural implement system of claim 1, comprising a directional control valve communicatively coupled to the control system, wherein the directional control valve is configured to control a flow of fluid from a fluid power supply to the actuating cylinder.

5. The agricultural implement system of claim 3, comprising a plurality of ground engaging tools coupled to a frame, wherein the actuating cylinder is configured to transition the plurality of ground engaging tools between the working position and the non-working position by rotating the frame.

6. The agricultural implement system of claim 1, wherein the product delivery system comprises a metering assembly disposed within an air cart.

7. An agricultural implement system, comprising:
    a control system configured to receive a first signal to initiate seeding operations, to transition a ground engaging tool toward a working position at a first time after receiving the first signal, and to activate a product delivery system at a second time, different from the first time, after receiving the first signal, wherein the product delivery system is configured to transfer a product to a seed tube proximate to the ground engaging tool upon activation.

8. The agricultural implement system of claim 7, wherein the first time and the second time are selected such that the ground engaging tool reaches the working position and product deposition into soil is initiated substantially simultaneously.

9. The agricultural implement system of claim 7, wherein the control system is configured to receive a second signal to terminate seeding operations, to transition the ground engaging tool toward a non-working position at a third time after receiving the second signal, and to deactivate the product delivery system at a fourth time, different from the third time, after receiving the second signal.

10. The agricultural implement system of claim 9, wherein the third time and the fourth time are selected such that the ground engaging tool is withdrawn from the working position and product deposition into the soil is terminated substantially simultaneously.

11. The agricultural implement system of claim 7, comprising a user interface configured to send the first signal to the control system based on operator input.

12. The agricultural implement system of claim 11, wherein the user interface is configured to adjust the first time and the second time based on operator input.

13. The agricultural implement system of claim 7, comprising a spatial locating device configured to send the first signal to the control system based on position of the agricultural implement system.

14. The agricultural implement system of claim 7, wherein the product delivery system comprises a metering assembly disposed within an air cart.

15. A method of operating an agricultural implement system, comprising:
providing a control system configured to receive a first signal to initiate seeding operations;
transitioning a ground engaging tool toward a working position at a first time after receiving the first signal;
activating a product delivery system at a second time, different from the first time, after receiving the first signal, wherein the first time and the second time are selected such that the ground engaging tool reaches the working position and product deposition into soil is initiated substantially simultaneously, wherein the product delivery system is configured to transfer a product to a seed tube proximate to the ground engaging tool upon activation.

16. The method of claim 15, comprising:
receiving a second signal to terminate seeding operations;
transitioning the ground engaging tool toward a non-working position at a third time after receiving the second signal;
deactivating the product delivery system at a fourth time after receiving the second signal, wherein the third time and the fourth time are selected such that the ground engaging tool is withdrawn from the working position and product deposition into the soil is terminated substantially simultaneously.

17. The method of claim 16, wherein the first time, the second time, the third time and the fourth time are adjustable via a user interface.

18. The method of claim 16, wherein the first signal and the second signal are received from a user interface.

19. The method of claim 16, wherein the first signal and the second signal are received from a spatial locating device.

* * * * *